United States Patent
Patil et al.

(10) Patent No.: US 11,092,079 B2
(45) Date of Patent: Aug. 17, 2021

(54) SUPPORT ARRANGEMENTS, FIRE AND OVERHEAT DETECTION SYSTEMS, AND METHODS OF MAKING SUPPORT ARRANGEMENTS FOR FIRE AND OVERHEAT DETECTION SYSTEMS

(71) Applicant: Kidde Technologies, Inc., Wilson, NC (US)

(72) Inventors: Rhushikesh Patil, Karnataka (IN); Vinod Maruti Naik, Karnataka (IN); Scott Kenneth Newlin, Willow Spring, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 0 days.

(21) Appl. No.: 16/573,566

(22) Filed: Sep. 17, 2019

(65) Prior Publication Data
US 2021/0017909 A1     Jan. 21, 2021

(30) Foreign Application Priority Data
Jul. 18, 2019 (IN) .............................. 201911028998

(51) Int. Cl.
*F02C 7/25* (2006.01)
*B64C 1/40* (2006.01)
(Continued)

(52) U.S. Cl.
CPC ............... *F02C 7/25* (2013.01); *B64C 1/406* (2013.01); *C23C 2/04* (2013.01); *G01K 3/005* (2013.01); *B64D 2045/009* (2013.01)

(58) Field of Classification Search
CPC .. F02C 7/25; B64C 1/406; C32C 2/04; G01K 3/005
See application file for complete search history.

(56) References Cited

U.S. PATENT DOCUMENTS 2,790,614 A    4/1957 Miller
3,054,586 A    9/1962 Kirkup
(Continued)

FOREIGN PATENT DOCUMENTS

| CN | 106051309 A | 10/2016 |
| EP | 3106686 A1 | 12/2016 |
| EP | 3376057 A1 | 9/2018 |

OTHER PUBLICATIONS

Abstract of CN106051309A dated Oct. 25, 2016, 1 page.
(Continued)

*Primary Examiner* — Kyung S Lee
(74) *Attorney, Agent, or Firm* — Cantor Colburn LLP (57) ABSTRACT

A support arrangement include a mount, a cover, and a metallic mesh body. The mount has a base portion and a mount clamping portion. The cover has a plate portion and a cover clamping portion, the cover fixed to the base portion of the mount and the cover clamping portion registered to the mount clamping portion. The metallic mesh body is arranged between the mount clamping portion and the cover clamping portion to compressively support a sensor element between the mount clamping portion and the cover clamping portion. Fire and overheat detection systems, gas turbine engines with fire and overheat detection systems, and methods of making support arrangements for fire and overheat detection systems are also described.

18 Claims, 6 Drawing Sheets

(51) Int. Cl.
*C23C 2/04* (2006.01)
*G01K 3/00* (2006.01)
*B64D 45/00* (2006.01)

(56) References Cited

U.S. PATENT DOCUMENTS

| | | | | |
|---|---|---|---|---|
| 3,458,163 | A * | 7/1969 | Egerton-Smith | H02G 3/32 |
| | | | | 248/67.5 |
| 3,470,744 | A * | 10/1969 | Lindberg | G01K 5/44 |
| | | | | 374/111 |
| 4,117,259 | A * | 9/1978 | Giebel | H02G 15/013 |
| | | | | 174/92 |
| 4,119,285 | A * | 10/1978 | Bisping | F16L 3/13 |
| | | | | 248/72 |
| 4,268,947 | A * | 5/1981 | Hile | F16L 5/10 |
| | | | | 277/606 |
| 8,770,537 | B2 * | 7/2014 | Go | F16L 3/237 |
| | | | | 248/560 |
| 9,285,277 | B2 * | 3/2016 | Toudou | H01R 13/428 |
| 9,482,113 | B2 | 11/2016 | Graily et al. | |
| 9,537,296 | B2 * | 1/2017 | Park | E21B 17/026 |
| 9,559,507 | B2 | 1/2017 | Hutchinson | |
| 10,101,218 | B2 | 10/2018 | Ding et al. | |
| 10,663,353 | B2 * | 5/2020 | Newlin | F16B 2/065 |
| 2006/0013282 | A1 * | 1/2006 | Hanzawa | G01K 7/22 |
| | | | | 374/163 |
| 2007/0164160 | A1 * | 7/2007 | Guillois | F16L 3/1041 |
| | | | | 244/129.2 |
| 2013/0294900 | A1 | 11/2013 | Graily et al. | |

OTHER PUBLICATIONS

Extended European Search Report for International Application No. 19212742.1 dated Jul. 24, 2020, 10 pages.
ERG Aerospace—Materials & Aerospace, "Duocel® Foam Materials", http://ergaerospace.com/ (retrieved Sep. 6, 2019), 6 pages.
HRL Laboratories, http://www.hrl.com/ (retrieved on Sep. 6, 2019), 2 pages.
Hutchinson, "Stop-Choc® all-metal cushion—Hutchinson Stop-Choc", http://www.stop-choc.de/en/products/stop-choc-all-metal-cushion.html (retrieved Sep. 6, 2019), 4 pages.
Hutchinson, Metal and Mesh Isolators—MET-L-FLEX Bushings, http://www.hutchinsonai.com/metal-and-mesh-isolators-met-l-flex-bushings (retrieved Sep. 9, 2019), 4 pages.
Kinetic Structures, "Wire Mesh Characteristics", https://www.kineticstructures.com/wire-mesh-characteristics (retrieved Sep. 6, 2019), 2 pages.
Metal Textiles Corporation, "Knitted Wire Mesh Shock & Vibration Reduction", http://www.metaltextiles.com/knitted-wire-mesh-vibration-reduction/ (retrieved Sep. 9, 2019) 2 pages.
SciNews, "Metallic Microlattice—How It's Made", YouTube, Oct. 13, 2015, https://www.youtube.com/watch?v=qJt7zoJi7gQ (retrieved on Sep. 6, 2019), 70 pages.

* cited by examiner

SUPPORT ARRANGEMENTS, FIRE AND OVERHEAT DETECTION SYSTEMS, AND METHODS OF MAKING SUPPORT ARRANGEMENTS FOR FIRE AND OVERHEAT DETECTION SYSTEMS

CROSS-REFERENCE TO RELATED APPLICATIONS

This application is a Non-Provisional of Indian Application Serial No. 201911028998 filed Jul. 18, 2019, the disclosure of which is incorporated herein by reference in its entirety.

BACKGROUND

The present disclosure relates generally to fire and overheat detection, and more particularly to support arrangements for sensor elements in fire and overheat detection systems.

Vehicles, such as aircraft, commonly include fire and overheat detection systems for monitoring spaces within the vehicle for fire and/or overheating. Fire and overheating detection systems generally include thermal detectors and/or other types of sensor elements to provide an indication of elevated temperature and/or of fire events. The thermal detectors and/or sensor elements are typically supported within (or within view) to the space monitored for fire and/or overheating, generally using a mounting structure.

In the case of gas turbine engines, mounting systems typically space the thermal detectors and/or sensor elements away from the engine structure. This allows the thermal detector and/or sensor element to monitors temperature between the engine and the nacelle, avoids the need to directly contact hot surfaces of the engine, and allows the mounting system to dampen vibration communicated to the thermal detector or sensor element from the engine. In some engines the temperature between the engine and the nacelle can rise to above those at which polymeric materials and polytetrafluoroethylene (PTFE) materials change, e.g., becoming brittle or melting, limiting the ability of the mounting system to dampen vibration communicated to the thermal detector and/or sensor element.

Such systems and methods have generally been acceptable for their intended purpose. However, there remains a need for improved support arrangements, fire and overheat detection systems having support arrangements, and methods of making support arrangements for fire and overheat detection systems.

BRIEF DESCRIPTION

Disclosed is a support arrangement. The support arrangement includes a mount with a base portion and a mount clamping portion; a cover with a plate portion and a cover clamping portion, the cover fixed to the base portion of the mount and the cover clamping portion registered to the mount clamping portion; and a metallic mesh body arranged between the mount clamping portion and the cover clamping portion to compressively support a sensor element between the mount clamping portion and the cover clamping portion.

In addition to one or more of the features described above, or as an alternative, further embodiments may include wherein the metallic mesh body is formed from a metal material.

In addition to one or more of the features described above, or as an alternative, further embodiments may include wherein the mount is formed from a metal material.

In addition to one or more of the features described above, or as an alternative, further embodiments may include wherein the cover is formed from a metal material.

In addition to one or more of the features described above, or as an alternative, further embodiments may include wherein the metallic mesh body is connected to the mount clamping portion of the mount.

In addition to one or more of the features described above, or as an alternative, further embodiments may include wherein the metallic mesh body is connected to the cover clamping portion of the mount.

In addition to one or more of the features described above, or as an alternative, further embodiments may include wherein brazing fixes the metallic mesh body to one of the cover clamping portion of the cover and the mount clamping portion of the mount.

In addition to one or more of the features described above, or as an alternative, further embodiments may include wherein a weld fixes the metallic mesh body to one of the cover clamping portion of the cover and the mount clamping portion of the mount.

In addition to one or more of the features described above, or as an alternative, further embodiments may include a fastener fixing the cover to the mount.

In addition to one or more of the features described above, or as an alternative, further embodiments may include wherein the metallic mesh body defines an annular profile spanning less than 180 degrees.

In addition to one or more of the features described above, or as an alternative, further embodiments may include an anti-abrasion coating disposed on the metallic mesh body.

In addition to one or more of the features described above, or as an alternative, further embodiments may include a sensor element compressively seated between the metallic mesh body and one of the cover clamping portion and the mount clamping portion, wherein the metallic mesh body is compressed to between about 80% and about 85% of an uncompressed volume of the metallic mesh body.

In addition to one or more of the features described above, or as an alternative, further embodiments may include a sensor element arranged between the mount clamping portion and the cover clamping portion, the sensor element comprising: a first electrode; a second electrode spaced apart from the first electrode; a thermistor body electrically separating the first electrode from the second electrode; and a metallic tube encapsulating the thermistor body, the first electrode, and the second electrode, wherein the metallic tube is compressively received between the metallic mesh body and the other of the cover clamping portion of the cover and the mount clamping portion of the mount.

In addition to one or more of the features described above, or as an alternative, further embodiments may include wherein the metallic mesh body has a damping coefficient that is substantially equivalent to a damping coefficient of a grommet formed from polytetrafluoroethylene, the grommet sized to support the sensor element between the mount clamping portion and the cover clamping portion.

In addition to one or more of the features described above, or as an alternative, further embodiments may include wherein the metallic mesh body is a mount metallic mesh body fixed to the mount clamping portion of the mount, and further comprising a cover metallic mesh body, the cover metallic mesh body fixed to the cover clamping portion of the cover.

In addition to one or more of the features described above, or as an alternative, further embodiments may include wherein the mount clamping portion is a first mount clamping portion, the mount having a second mount clamping portion spaced apart from the first mount clamping portion by the base portion of the mount; wherein the cover clamping portion is a first cover clamping portion, the cover clamping portion having a second cover clamping portion spaced apart from the first cover clamping portion by the plate portion of the cover, the second cover clamping portion registered to the second mount clamping portion.

Also disclosed is a fire and overheat protection system. The fire and overheat protection system includes a first support arrangement and one or more second support arrangement as described above, the first support arrangement spaced apart from the second support arrangement; and a sensor element supported by the first support arrangement and the second support arrangement, wherein the sensor element is compressively seated between the mount clamping portion and the cover clamping portion of the first support arrangement, and wherein the sensor element is compressively seated between the mount clamping portion and the cover clamping portion of the second support arrangement.

In addition to one or more of the features described above, or as an alternative, further embodiments may include a support rail, wherein the mount of the first support arrangement is welded to the support rail, wherein the mount of the second support arrangement is welded to the support rail.

Additionally disclosed is a gas turbine engine. The gas turbine engine includes a case enclosing one or more of a compressor, a combustor, and a turbine; a support arrangement as described above, wherein the support arrangement is fixed relative to the case; and a sensor element compressively seated between the metallic mesh body and one of the mount clamping portion and the cover clamping portion, wherein the sensor element is spaced apart from the case.

Further disclosed is a method of making a support arrangement. The method includes, at a support arrangement having a mount with a base portion and mount clamping portion, a cover with a plate portion and a cover clamping portion, and a metallic mesh body; supporting a sensor element with the mount clamping portion of the mount; registering the cover clamping portion of the cover to the mount clamping portion of the mount; compressing the metallic mesh body between the sensor element and the other of the mount clamping portion of the mount and the cover clamping portion of the cover; and fixing the plate portion of the cover to the base portion of the mount.

In addition to one or more of the features described above, or as an alternative, further embodiments may include further embodiments of the method may include fixing the metallic mesh body to one of the mount clamping portion of the mount and the cover clamping portion of the cover, wherein the metallic mesh body is compressed by between about 15% to about 20% of an uncompressed volume of the metallic mesh body.

Technical effects of the present disclosure include the capability to support detectors in fire and overheat detection systems in environments with temperatures above those at which the mechanical properties of polymeric and/or glass-filled PTFE materials change. Technical effects also include the capability to match the installation envelope of the polymeric and/or glass-filled PTFE grommets employed in most fire and overheat detection systems used to support detection elements. Technical effects also include the capability to substantially match the damping characteristics provided by the polymeric and/or glass-filled PTFE grommets employed in some fire and overheat detection systems.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
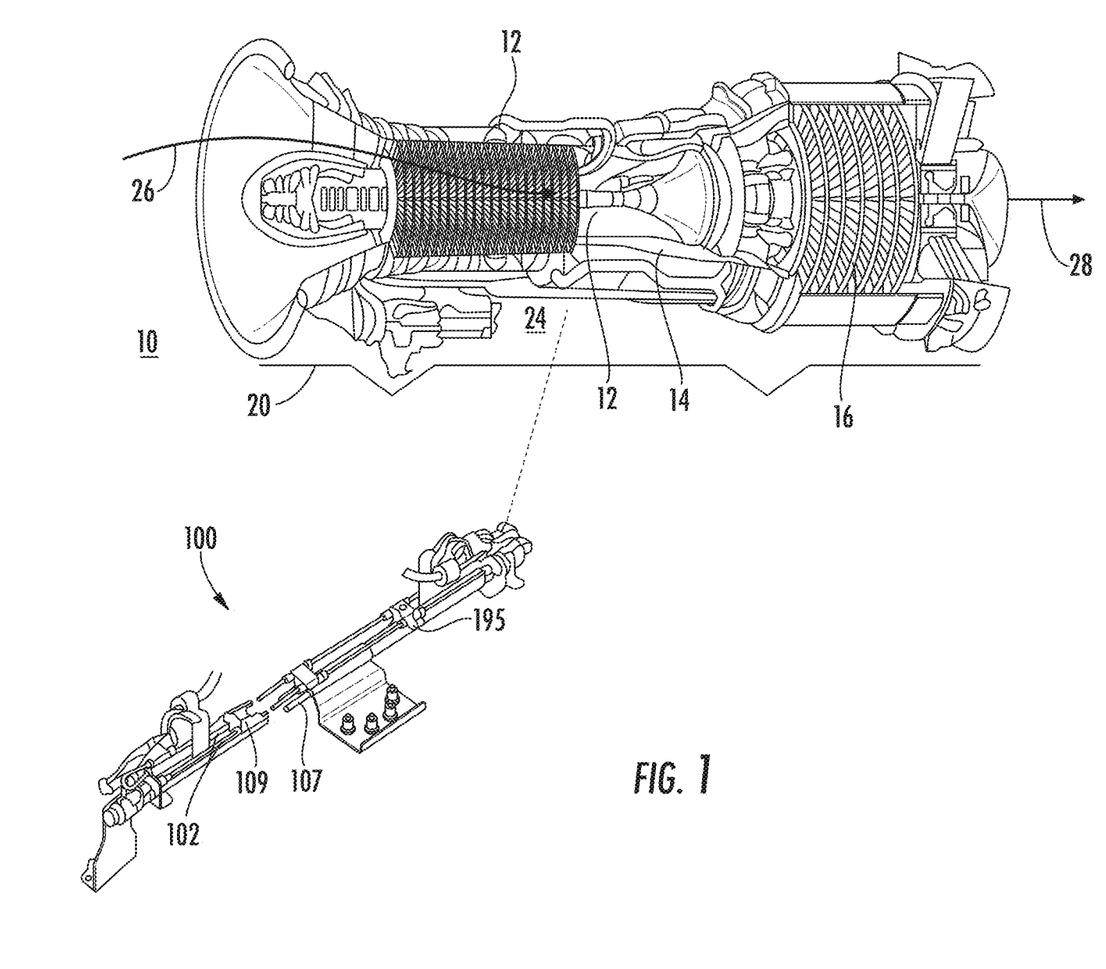
FIG. 1 a schematic view of gas turbine engine that includes a case and has a support arrangement constructed in accordance with the present disclosure attached to the case such that the support arrangement supports a sensor element for a fire and overheat detection system at a location spaced apart from the case.

Reference will now be made to the drawings wherein like reference numerals identify similar structural features or aspects of the subject disclosure. For purposes of explanation and illustration, and not limitation, a partial view of an exemplary embodiment of a support arrangement in accordance with the disclosure is shown in FIG. 1 and is designated generally by reference character 104. Other embodiments of support arrangements, overheat and fire detection systems, and methods of making support arrangements in accordance with the present disclosure, or aspects thereof, are provided in FIGS. 2-6, as will be described. The systems and methods described herein can be used for supporting sensor elements in overheat and fire detection systems in gas turbines, such as in aircraft, though the present disclosure is not limited to fire and overheat detection systems for gas turbine engines or to aircraft in general.

Referring to FIG. 1, a gas turbine engine 10 is shown. The gas turbine engine 10 includes a compressor 12, a combustor 14, and a turbine 16. The gas turbine engine 10 also includes a case 18, a nacelle 20, and an overheat and fire and overheat detection system 100.

The nacelle 20 encloses the case 18 and defines therebetween a fire-protected space 22. The case 18 in turn encloses the compressor 12, the combustor 14, and the turbine 16. The compressor 12 is operably associated with the turbine 16, is in fluid communication with the ambient environment 24, and is configured to generate a working fluid flow 26 using work W provided by the turbine 16. The combustor 14 is in fluid communication with the compressor 12 and is arranged to generate a high pressure combustion product flow 28 using the working fluid flow 26. The turbine 16 is in fluid communication with the combustor 14 and is arranged to extract work from the high pressure combustion product flow 28 received from the combustor 14, a portion of which the turbine 16 communicates to the compressor 12 as work W.

The fire and overheat detector system 100 includes a sensor element 102, a support arrangement 104, and a support rail 107. The support rail 107 is connected to the case 18 of the gas turbine engine 10. The support arrangement 104 is connected to the support rail 107 and supports the sensor element 102. As shown in FIG. 1, the fire and overheat detection system 100 is a continuous fire and overheat detection system 100. In this respect the support arrangement 104 is a first support arrangement 104 and the fire and overheat detection system 100 includes a second support arrangement 105. The second support arrangement 105 is connected to the support rail 107, is spaced apart from the first support arrangement 104, and supports the sensor element 102 in cooperation with the first support arrangement 104. It is contemplated that first support arrangement 104 and/or the second support arrangement 105 be welded to the support rail 107. Although a continuous fire and overheat detection system 100 is shown in the illustrated embodiment it is to be understood and appreciated that spot-type first and overheat detection systems can also benefit from the present disclosure.

As will be appreciated by those of skill in the art in view of the present disclosure, the case 18 of the gas turbine engine 10 communicates heat to the fire-protected space 22 during operation. To detect an overheating of the gas turbine engine 10 the fire and overheat detection system 100 is connected to the gas turbine engine 10. The fire and overheat detection system 100 is arranged at least partially within the fire-protected space 22 and includes the sensor element 102 and the support arrangement 104. The support arrangement 104 is connected to the case 18 of the gas turbine engine 10 and extends therefrom within the fire-protected space 22 and towards the nacelle 20. The sensor element 102 is supported by the support arrangement 104. In one embodiment the sensor element is mechanically damped by the support arrangement 104 from vibration communicated by the gas turbine engine 10, and is configured to provide an indication of temperature of the case 18, e.g., via resistivity change of a thermistor body 180 (shown in FIG. 5) contained within the sensor element 102. The sensor element 102 and the fire and overheat detection system 100 can be as shown and described in U.S. Pat. No. 7,098,797 B2 to Chahrour et al., issued on Aug. 29, 2006, the contents of which are incorporated herein by reference in their entirety.

As will also be appreciated by those of skill in the art in view of the present disclosure, some gas turbines can communicate heat to fire protected spaces within the nacelle above temperatures at which certain materials exhibit changes in their mechanical properties. For example, in environments with temperatures above 300° Celsius, materials like polytetrafluoroethylene (PTFE) can lose their ability to provide mechanical dampening to sensor elements and/or melt. To provide mechanical dampening to the sensor element 102 the support arrangement 104 of one embodiment has a metallic mesh body 106 (shown in FIG. 2). The metallic mesh body 106 is configured to support the sensor element 102 and provide mechanical dampening to the sensor element 102 at high temperatures, e.g., temperatures above 300° Celsius, the fire and overheat detection system 100 thereby continuing to detect fire and overheat events within fire-protected space 22 irrespective of relatively high ambient temperatures during operation of the gas turbine engine 10.

Figure 2:
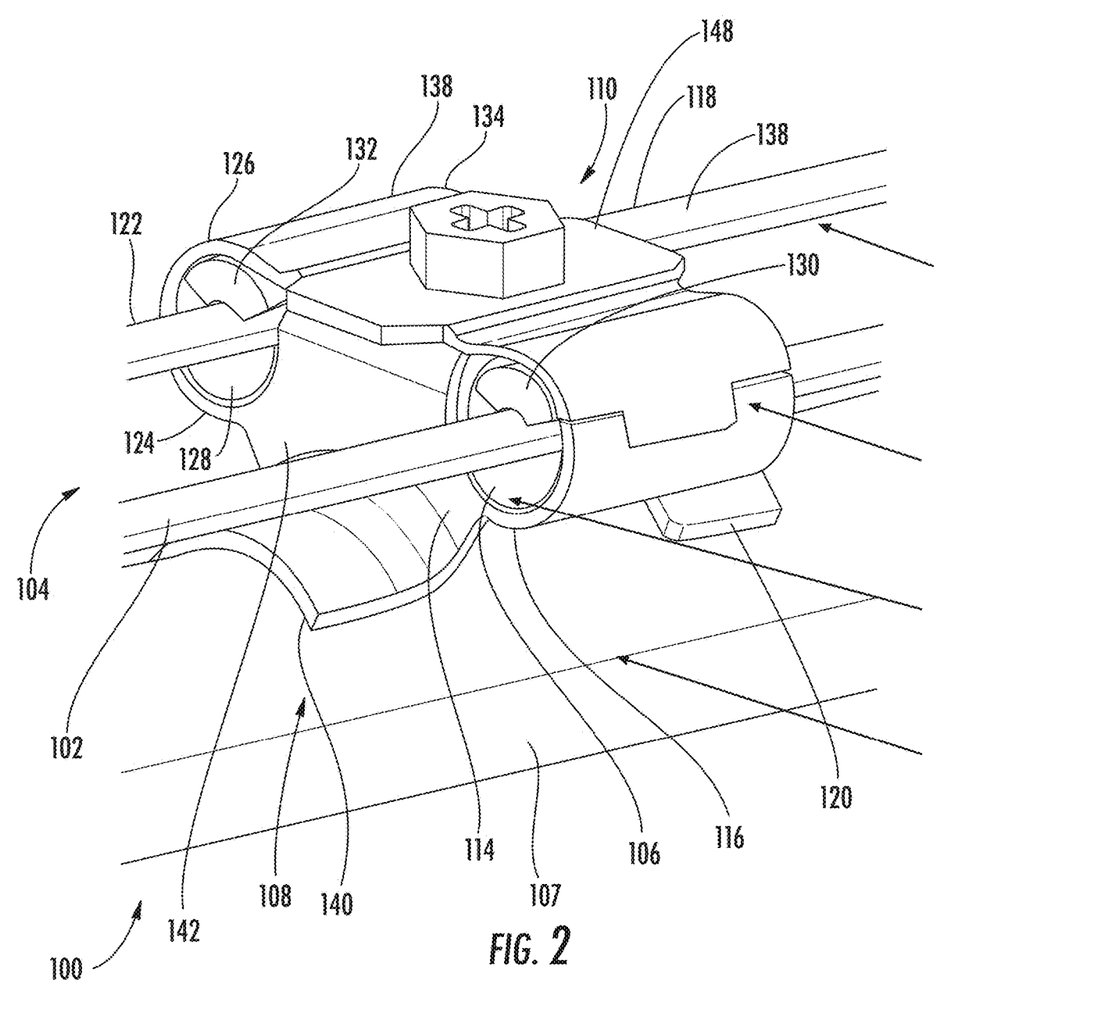
FIG. 2 is a partial perspective view of a portion of the fire and overheat detection system of FIG. 1, showing the support arrangement connecting the sensor element through an intermediate support rail.

With reference to FIG. 2, the support arrangement 104 is shown. The support arrangement generally includes the metallic mesh body 106, a mount 108, and a cover 110. The mount 108 has a base portion 114 and a mount clamping portion 116. The cover 110 has a plate portion 118 and a cover clamping portion 120, the cover 110 fixed to the base portion 114 of the mount 108 and the cover clamping portion 120 registered to the mount clamping portion 116. The metallic mesh body 106 is arranged between the mount clamping portion 116 and the cover clamping portion 120 to compressively support the sensor element 102 between the mount clamping portion 116 and the cover clamping portion 120.

In the illustrated embodiment the support arrangement 104 is arranged to support both the sensor element 102 and a second sensor element 122. In this this respect the mount clamping portion 116 is a first mount clamping portion 116 and the mount 108 has a second mount clamping portion 124. The cover clamping portion 120 is a first cover clamping portion 120 and the cover 110 has a second cover clamping portion 126. The metallic mesh body 106 is a first mount metallic mesh body 106 and the support arrangement 104 includes a second mount metallic mesh body 128, a first cover metallic mesh body 130, a second cover metallic mesh body 132. As shown the support arrangement 104 also includes a fastener 134.

The mount 108 is formed from a mount metallic material 138, e.g., a metal such as steel, has a flange portion 140 and a stem portion 142, and defines a threaded aperture 144. The flange portion 140 extends laterally from the stem portion 142, is arranged on a side of the stem portion 142 opposite the first mount clamping portion 116 and the second mount clamping portion 124, and configured for connecting the support arrangement 104 to the case 18 and/or the nacelle 20. Connection can be, for example, by connection to an intermediate support rail 146.

The threaded aperture 144 is defined within the stem portion 142 and on an end of the stem portion 142 opposite the flange portion 140, and has therein female threads corresponding to threads of the fastener 134. The first mount clamping portion 116 and the second mount clamping portion 124 extend laterally from the stem portion 142 on the end opposite the flange portion 140, and are spaced apart from one another by the threaded aperture 144. The first mount clamping portion 116 is arranged to support the sensor element 102 and has an arcuate profile corresponding generally to a portion of the exterior the sensor element 102. The second mount clamping portion 124 is similar to the first mount clamping portion 116 and is additionally arranged on a side of the mount 108 opposite the first mount clamping portion 116.

The cover 110 is formed from the mount metallic material 138 and has the first cover clamping portion 120, the second cover clamping portion 126, and the plate portion 118. The plate portion 118 defines a fastener aperture 150 (shown in FIG. 3), is arranged between the first cover clamping portion 120 and the second cover clamping portion 126, and is configured to receive therethrough the fastener 134. The first cover clamping portion 120 extends laterally from the plate portion 118 and on a side of the plate portion 118 opposite the first cover clamping portion 120, and has an arcuate profile corresponding generally to a portion of the exterior of the second sensor element 122. The second cover clamping portion 126 is similar to the first cover clamping portion 120 and is additionally arranged on a side of the plate portion 118 opposite the first cover clamping portion 120.

Figure 3:
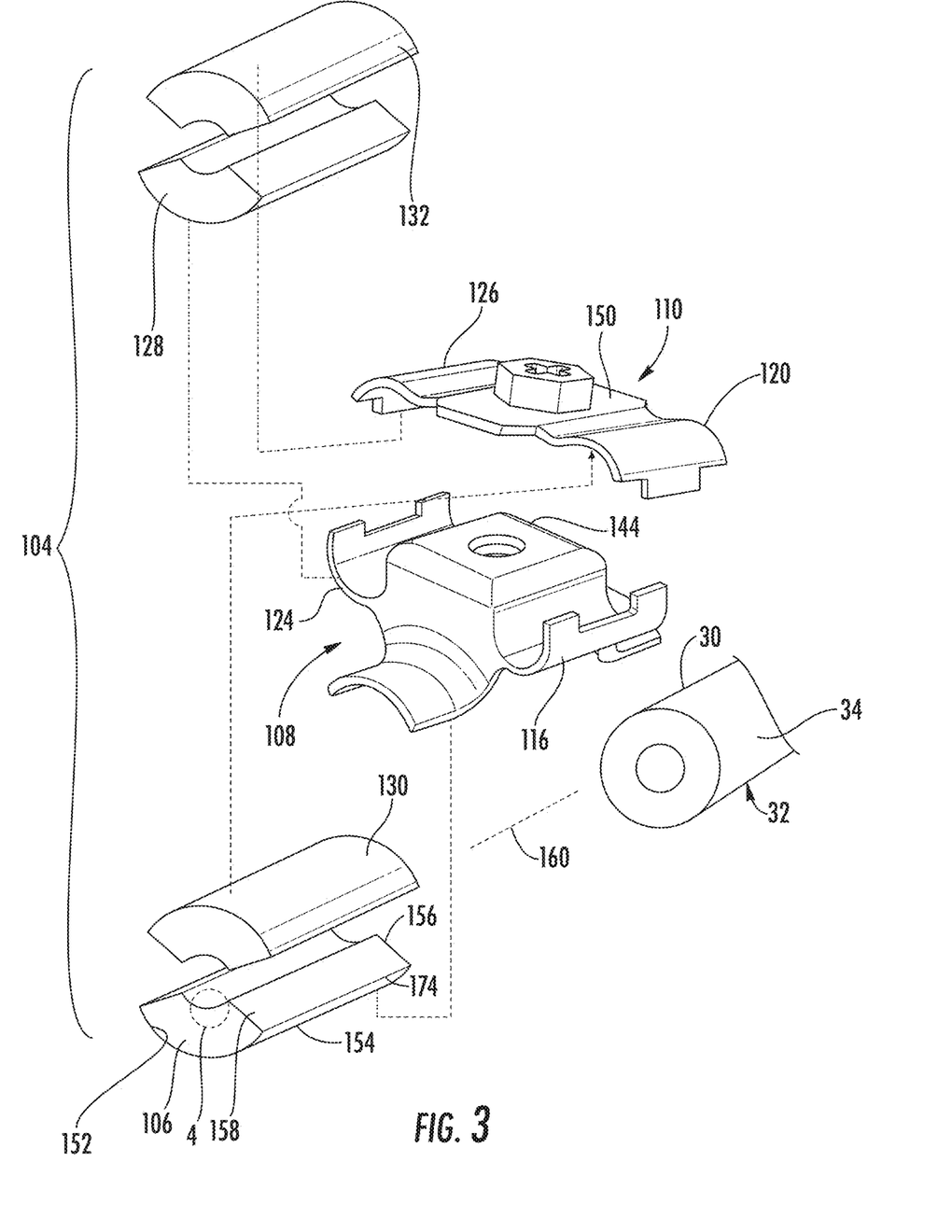
FIG. 3 is an exploded view of the support arrangement of FIG. 1, showing metallic mesh bodies and a cover of the support arrangement exploded away from a mount of the support arrangement.

With reference to FIG. 3, the support arrangement 104 is shown with the first mount metallic mesh body 106 exploded away from the mount 108. The first mount metallic mesh body 106 has an annular profile 152 and a damping coefficient 154, is formed from a metallic material 156, and includes an anti-abrasion coating 158. The annular profile 152 extends longitudinally along a sensor element axis 160, is radially offset from the sensor element axis 160, and extends circumferentially about the sensor element axis 160. It is contemplated that annular profile 152 have a span that is less than 180 degrees, e.g., between about 160 degrees and about 175 degrees. Spans of less than 180 degrees range allow the first mount metallic mesh body 106 to remain spaced apart from the first cover metallic mesh body 130 when the cover 110 is fastened to the mount 108. As will be appreciated by those of skill in the art in view of the present disclosure, spacing the first mount metallic mesh body 106 from the first cover metallic mesh body 130 prevents entanglement of each with the other, allowing the cover 110 to be removed from the mount 108, e.g., for service and/or replacement of the sensor element 102 (shown in FIG. 1), without having to disentangle (or cut) the first mount metallic mesh body 106 from the first cover metallic mesh body 130 and/or the first cover metallic mesh body 130 from the first mount metallic mesh body 106.

The damping coefficient 154 is selected to dampen the sensor element 102 (shown in FIG. 2). More specifically, the damping coefficient 154 is selected to dampen the sensor element 102 from vibration communicated to the sensor element 102 from the gas turbine engine 10 (shown in FIG. 1). In certain embodiments the damping coefficient 154 is selected to dampen vibration within a frequency range of between about 5 hertz and about 10,000 hertz, which can be characteristic of certain types of gas turbine engines. In accordance with certain embodiments the damping coefficient 154 matches a damping coefficient 30 of a grommet 32 formed from a PTFE material 34 (e.g., a glass-filled PTFE material), allowing the support arrangement 104 to provide damping to the sensor element 102 without employing the grommet 32. As will be appreciated by those of skill in the art in view of the present disclosure, this can eliminate the foreign object damage (FOD) hazard potentially posed by the grommet 32 as the first mount metallic mesh body 106 may be fixed to the mount 108 by brazing or welding, as will be described.

The metallic material 156 is selected to retain its mechanical properties in high temperature environments, e.g., at temperatures greater than 300° Celsius. Retention of its mechanical properties at high temperatures enables the first mount metallic mesh body 106 to support the sensor element 102 in high temperature environments, e.g., within the fire-protected space 22 (shown in FIG. 1) between the nacelle 20 (shown in FIG. 1) and the case 18 (shown in FIG. 1). Retention of its mechanical properties at high temperatures also enables the first mount metallic mesh body 106 to dampen the sensor element 102 in high temperature environments, e.g., within the fire-protected space 22 between the nacelle 20 and the case 18. In certain embodiments the metallic material 156 is a metal, such as steel. In accordance with certain embodiments the metallic material 156 can be a stainless steel material such as a nickel alloy or an alloy of nickel. Examples of suitable stainless steel materials include nickel alloys and alloys of nickel such as Inconel® alloys, available from the Huntington Alloys Corporation of Huntington, W. Va.

The anti-abrasion coating 158 is disposed on the first mount metallic mesh body 106 and is configured to limit (or eliminate entirely) wear between the first mount metallic mesh body 106 and the sensor element 102. In certain embodiments the anti-abrasion coating 158 can be conformally disposed on surfaces of wires 162 (shown in FIG. 4) forming the first mount metallic mesh body 106.

It is contemplated that the first mount metallic mesh body 106 be fixed to the support arrangement 104. More specifically, the first mount metallic mesh body 106 is fixed to the first mount clamping portion 116 of the mount 108. In certain embodiments the first mount metallic mesh body 106 is fixed to the first mount metallic mesh body 106 by brazing, e.g., by a braze 164 (shown in FIG. 5). In accordance with certain embodiments the first mount metallic mesh body 106 may be fixed to the first mount clamping portion 116 by welding, e.g., by a weld 166. Brazing or welding the first mount metallic mesh body 106 to the first mount clamping portion 116 limits (or eliminates entirely) the FOD hazard potentially presented by the first mount metallic mesh body 106 as it renders the first mount metallic mesh body 106 integral with the cover 110.

Figure 4:
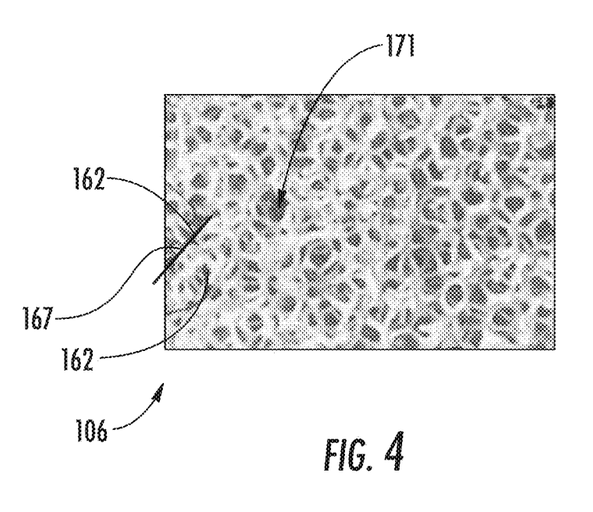
FIG. 4 is an image of an example of a metallic mesh body of the support arrangement of FIG. 1, showing steel wires and pores of the metallic mesh body selected to provide the metallic damping body with a predetermined damping coefficient.

With reference to FIG. 4, a portion of the first mount metallic mesh body 106 is shown. The first mount metallic mesh body 106 includes a plurality of wires 162. The plurality of wires 162 are formed from the metallic material 156 (shown in FIG. 3), have a width 167, i.e., a gauge size, and define between one another a plurality of pores 171. The plurality of pores 171 are interconnected with one another and define a porosity 174 (shown in FIG. 3) of the first mount metallic mesh body 106. It is contemplated that the either (or both) the width 167 and the porosity 174 of the first mount metallic mesh body 106 be selected to impart a predetermined magnitude to the damping coefficient 154 (shown in FIG. 3). In certain embodiments the damping coefficient 154 is selected to match the damping coefficient 30 (shown in FIG. 3) of the grommet 32 (shown in FIG. 3), the first mount metallic mesh body 106 thereby providing damping to the sensor element 102 (shown in FIG. 1) substantially equivalent to that of the grommet 32 at temperatures above those at which the mechanical properties of the PTFE material 34 (shown in FIG. 3) forming the grommet 32 begin to change.

With continuing reference to FIG. 3, the second mount metallic mesh body 128 is also similar to the first mount metallic mesh body 106, and is additionally fixed to the second mount clamping portion 124 of the mount 108. The first cover metallic mesh body 130 is additionally similar to the first mount metallic mesh body 106, and is additionally fixed to the first cover clamping portion 120 of the cover 110 at a location opposing the first mount metallic mesh body 106. The second cover metallic mesh body 132 is also similar to the first mount metallic mesh body 106, and is additionally fixed to the second cover clamping portion 126 of the cover 110 at a location opposing the second mount metallic mesh body 128.

Figure 5:
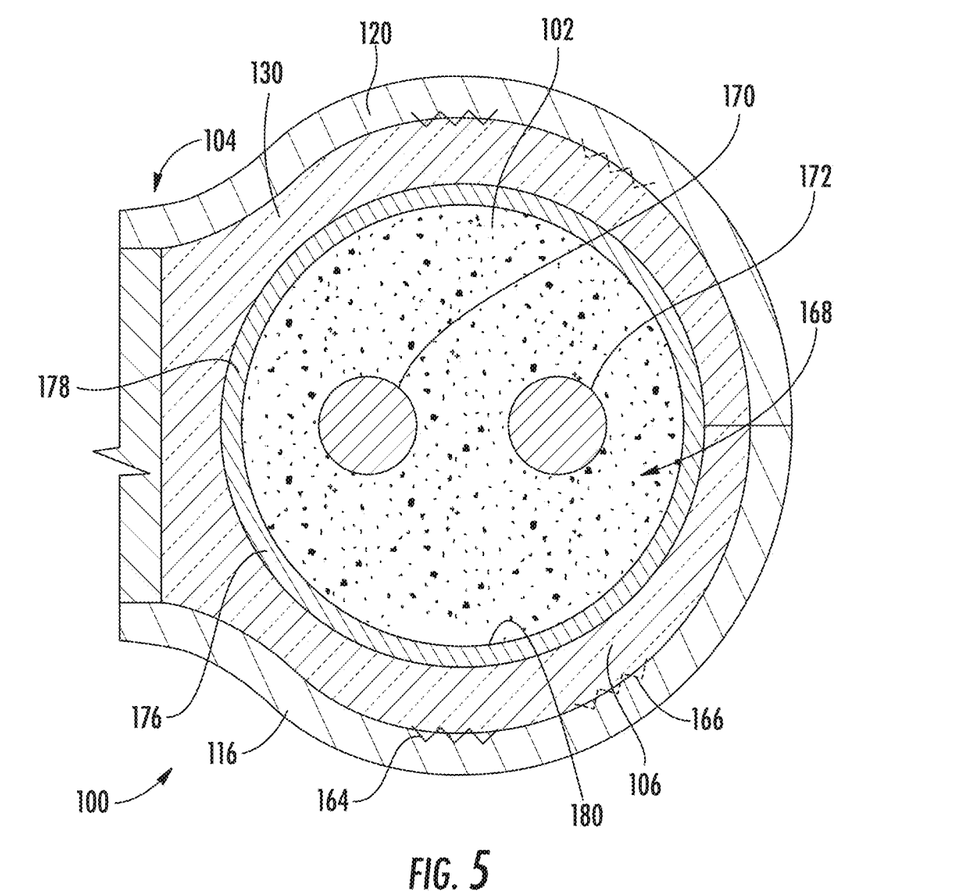
FIG. 5 is a cross-sectional view of the support arrangement and sensor element of the fire and overheat detection of FIG. 1, showing the metallic mesh body compressively supporting the sensor element.

With reference to FIG. 5, a portion of the support arrangement 104 and the sensor element 102 are shown. The first cover clamping portion 120 is registered to the first mount clamping portion 116. More specifically, the first cover clamping portion 120 overlays the first mount clamping portion 116 (relative to the top of FIG. 5), the first cover clamping portion 120 and the first mount clamping portion 116 thereby defining a clamping channel 168 between one another.

The first mount metallic mesh body 106 is connected to the first mount clamping portion 116 of the mount 108. In this respect the first mount metallic mesh body 106 is arranged within the clamping channel 168 between the sensor element 102 and the first mount clamping portion 116 of the mount 108 (shown in FIG. 2), the first mount metallic mesh body 106 compressively retaining therein the sensor element 102 in cooperation with the first cover metallic mesh body 130. In certain embodiments the first mount metallic mesh body 106 is brazed, e.g., with the braze 164, to the first mount clamping portion 116 of the mount 108. In accordance with certain embodiments the first mount metallic mesh body 106 can be welded, e.g., with the weld 166, to the first mount clamping portion 116 of the mount 108. It is also contemplated that the first mount metallic mesh body 106 can compress by between about 15% to about 20%, i.e., that the first mount metallic mesh body 106 can be compressed to between about 80% to about 85% of an uncompressed volume of the first mount metallic mesh body 106 during installation, the first mount metallic mesh body 106 thereby damping the sensor element 102 with damping force similar (and in certain embodiments equivalent) to that of the grommet 32 (shown in FIG. 3).

The first cover metallic mesh body 130 is similar to the first mount metallic mesh body 106 and is additionally connected to the first cover clamping portion 120 of the cover 110. In this respect the first cover metallic mesh body 130 is arranged within the clamping channel 168 between the sensor element 102 and the first cover clamping portion 120 of the cover 110, the first cover metallic mesh body 130 also compressively retaining therein the sensor element 102 within the clamping channel 168.

The sensor element 102 is arranged between the first mount clamping portion 116 and the first cover clamping portion 120 and includes a first electrode 170, a second electrode 172, a thermistor body 180, and a metallic tube 176. The second electrode 172 is spaced apart from the first electrode 170. The thermistor body 180 electrically separates the first electrode 170 from the second electrode 172. The metallic tube 176 encapsulates the thermistor body 180, the first electrode 170, and the second electrode 172, the metallic tube 176 being compressively between the first mount metallic mesh body 106 and the first cover clamping portion 120. Although a particular type of sensor element is shown in FIG. 5 and described herein and being housing within the metallic tube 176, it is to be understood and appreciated that other types of sensors can also benefit from the present disclosure.

In certain embodiments the metallic tube 176 is formed from a metallic material 178 such as a metal like steel, which resists abrasion by the first mount metallic mesh body 106 and/or the first cover metallic mesh body 130 responsive to vibrational forces exerted on the sensor element 102. The metallic material 178 can be, for example, a stainless steel material. In certain embodiments the first electrode 170 extends at least partially along a length of the sensor element 102 such that the sensor element 102 is configured as a continuous-type sensor element, though it is to be understand and appreciated that point-type sensor elements can also benefit from the present disclosure.

Figure 6:
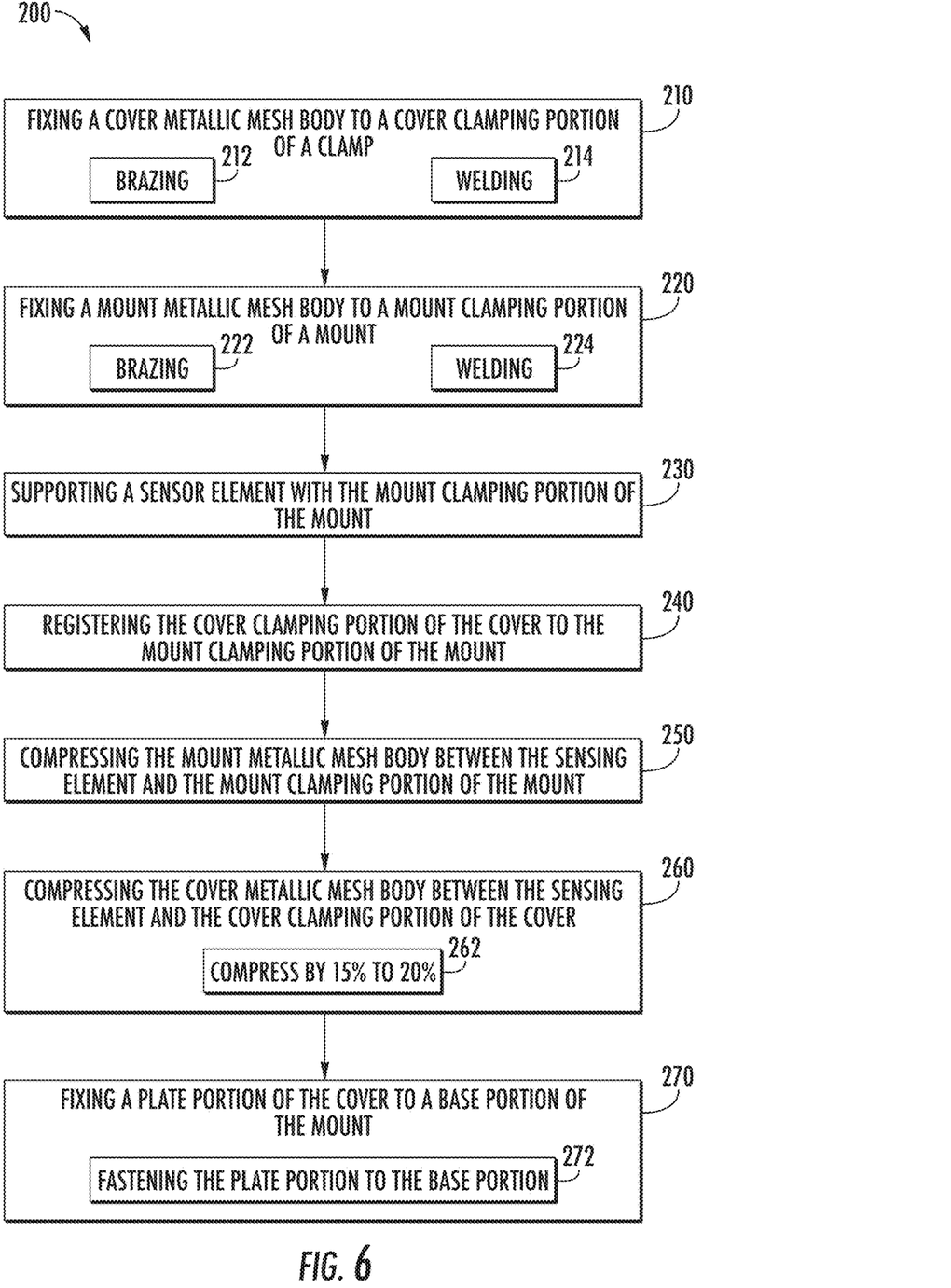
FIG. 6 is a block diagram of a method of making a sensor assembly for a fire and overheat detection system, showing steps of the method according to an illustrative and non-limiting embodiment of the method.

With reference to FIG. 6, a method 200 of making a support arrangement, e.g., the support arrangement 104 (shown in FIG. 1), is shown. The method 200 includes fixing a first cover metallic mesh body to a first cover clamping portion of a clamp, e.g., the first cover metallic mesh body 130 (shown in FIG. 2) to the first cover clamping portion 120 (shown in FIG. 2) of the cover 110 (shown in FIG. 2), as shown with box 210. As shown with box 212, the first cover metallic mesh body can be brazed to the first cover clamping portion of the cover, e.g., with the braze 164 (shown in FIG. 5). As shown with box 214, the cover metallic mesh body can be welded to the first cover clamping portion of the cover, e.g., with the weld 166 (shown in FIG. 5).

The method 200 also includes fixing a mount metallic mesh body to a mount clamping portion of a mount, e.g., the first mount metallic mesh body 106 (shown in FIG. 2) to the first mount clamping portion 116 (shown in FIG. 2) of the mount 108 (shown in FIG. 2), as shown with box 220. As shown with box 222, the first mount metallic mesh body can be brazed to the mount clamping portion of the mount. As shown with box 224, the first mount metallic mesh body can be welded to the first mount clamping portion of the mount.

As shown with box 230, the method 200 additionally includes supporting a sensor element, e.g., the sensor element 102, with the mount clamping portion of the mount. The first cover clamping portion of the cover is then registered to the first mount clamping portion of the mount, as shown with box 240, and the first mount metallic mesh body compressed between the sensing element and the first mount clamping portion of the mount, as shown with box 250. As shown with box 260, the method 200 can also (or alternatively) include compressing the first cover metallic mesh body between the sensing element and first cover clamping portion of the cover. For example, the first metallic mesh body can be compressed by about 15% to about 20% of an uncompressed volume of the first metallic mesh body, as shown with box 262. A plate portion of the cover, e.g., the plate portion 118 (shown in FIG. 2), is thereafter fixed to a base portion of the mount, e.g., a base portion 114 (shown in FIG. 2), as shown with box 270. Fixing the plate portion of the cover to the base portion of the mount can include fastening the cover to the mount with a fastener, e.g., with the fastener 134 (shown in FIG. 2), as shown with box 272.

In some fire and overheat detection systems grommets are used to support sensor elements. While generally acceptable for their intended purpose the mechanical properties of the materials forming such grommets can exhibit mechanical changes at high temperatures, e.g., at temperatures above 300° Celsius. In some fire and overheat detection systems change in the mechanical properties can change the damping provided by such grommets to the sensor elements and/or limit the ability of the grommet to support the sensor detector. For example, in gas turbines having fire-protected spaces rated for 450° Celsius ambient temperature, and excursion tolerance temperatures of 900° Celsius, the damping provided by such grommets can change—and in some instances the grommets can lose the capability to support the sensor element entirely or melt. Further, gas turbine engines increasing have larger areas where temperatures run above those where polymeric and PTFE materials change, limiting the application of structures formed of such materials to provide support and/or damping. And while metallic retention structures can be employed, such metallic structures tend to chafe the supported structures in applications where vibration is present.

In embodiments described herein sensor elements are supported by metallic mesh bodies. In certain embodiments the metallic mesh bodies are formed from steel wire mesh, e.g., a stainless steel material like nickel alloys and alloys of nickel, limiting weight of support arrangements used to support the sensor elements. In accordance with certain embodiments the wire size, i.e. gauge, and/or the porosity of the metallic mesh body, is selected both dampen the sensor element, support the sensor element, and/or resist vibration and shock to the sensor element. It is also contemplated that the metallic mesh body include an anti-abrasion coating, thereby limiting wear, and that the metallic mesh body be fixed to the support arrangement using brazing or welding, limiting (or eliminating entirely) the FOD hazard otherwise associated with the metallic mesh body.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A support arrangement, comprising:
a mount with a base portion and a mount clamping portion;
a cover with a plate portion and a cover clamping portion, the cover fixed to the base portion of the mount and the cover clamping portion registered to the mount clamping portion;
a sensor element arranged between the mount of clamping portion and the cover clamping portion, the sensor element comprising:
a first electrode;
a second electrode spaced apart from the first electrode;
a thermistor body electrically separating the first electrode from the second electrode, and
a metallic tube encapsulating the thermistor body, the first electrode, and the second electrode; and
a metallic mesh body arranged between the mount clamping portion and the cover clamping portion to compressively support the sensor element between the mount clamping portion and the cover clamping portion,
wherein the metallic tube is compressively received between the metallic mesh body and the other of the cover clamping portion of the cover and the mount clamping portion on the mount.

2. The support arrangement as recited in claim 1, wherein the metallic mesh body is formed from a metal material.

3. The support arrangement as recited in claim 1, wherein at least one of the mount and the cover is formed from a metal material.

4. The support arrangement as recited in claim 1, wherein the metallic mesh body is connected to the mount clamping portion of the mount.

5. The support arrangement as recited in claim 1, wherein the metallic mesh body is connected to the cover clamping portion of the mount.

6. The support arrangement as recited in claim 1, wherein brazing fixes the metallic mesh body to one of the cover clamping portion of the cover and the mount clamping portion of the mount.

7. The support arrangement as recited in claim 1, wherein a weld fixes the metallic mesh body to one of the cover clamping portion of the cover and the mount clamping portion of the mount.

8. The support arrangement as recited in claim 1, further comprising a fastener fixing the cover to the mount and compressing the metallic mesh body between the cover and the mount.

9. The support arrangement as recited in claim 1, wherein the metallic mesh body defines an annular profile spanning less than 180 degrees.

10. The support arrangement as recited in claim 1, further comprising an anti-abrasion coating disposed on the metallic mesh body.

11. The support arrangement as recited in claim 1, wherein the metallic mesh body is compressed to between about 80% and about 85% of an uncompressed volume of the metallic mesh body.

12. The support arrangement as recited in claim 1, wherein the metallic mesh body is a mount metallic mesh body fixed to the mount clamping portion of the mount, and further comprising a cover metallic mesh body, the cover metallic mesh body fixed to the cover clamping portion of the cover.

13. The support arrangement as recited in claim 1, wherein the mount clamping portion is a first mount clamping portion, the mount having a second mount clamping portion spaced apart from the first mount clamping portion by the base portion of the mount; wherein the cover clamping portion is a first cover clamping portion, the cover clamping portion having a second cover clamping portion spaced apart from the first cover clamping portion by the plate portion of the cover, the second cover clamping portion registered to the second mount clamping portion.

14. A fire and overheat detection system, comprising:
a first support arrangement and one or more second support arrangement as recited in claim 1, the first support arrangement spaced apart from the second support arrangement; and
a sensor element supported by the first support arrangement and the second support arrangement,
wherein the sensor element is compressively seated between the mount clamping portion and the cover clamping portion of the first support arrangement,
wherein the sensor element is compressively seated between the mount clamping portion and the cover clamping portion of the second support arrangement.

15. The fire and overheat detection system as recited in claim 14, further comprising a support rail, wherein the mount of the first support arrangement is welded to the support rail, wherein the mount of the second support arrangement is welded to the support rail.

16. A gas turbine engine, comprising:
a case enclosing one or more of a compressor, a combustor, and a turbine;
a support arrangement as recited in claim 1, wherein the support arrangement is fixed relative to the case; and a sensor element compressively seated between the metallic mesh body and one of the mount clamping portion and the cover clamping portion, wherein the sensor element is spaced apart from the case.

17. A method of making a support arrangement, comprising:
at support arrangement having a mount with a base portion and mount clamping portion, a cover with a plate portion and a cover clamping portion, and a metallic mesh body,
supporting a sensor element with the mount clamping portion of the mount, the sensor element being arranged between the mount clamping portion and the cover clamping portion, the sensor element comprising:
a first electrode;
a second electrode spaced apart from the first electrode;
a thermistor body electrically separating the first electrode from the second electrode, and
a metallic tube encapsulating the thermistor body, the first electrode, and the second electrode;
registering the cover clamping portion of the cover to the mount clamping portion of the mount;
compressing the metallic mesh body between the sensor element and the other of the mount clamping portion of the mount and the cover clamping portion of the cover, wherein the metallic tube is compressively received between the metallic mesh body and the other of the cover clamping portion of the cover and the mount clamping portion of the mount; and
fixing the plate portion of the cover to the base portion of the mount.

18. The method as recited in claim 17, further comprising fixing the metallic mesh body to one of the mount clamping portion of the mount and the cover clamping portion of the cover, wherein the metallic mesh body is compressed by between about 15% to about 20% of an uncompressed volume of the metallic mesh body.

* * * * *